United States Patent
Wilhelm

(10) Patent No.: US 8,347,758 B2
(45) Date of Patent: Jan. 8, 2013

(54) CLAMPING DEVICE FOR A STEERING COLUMN

(75) Inventor: Sigurd Wilhelm, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1051 days.

(21) Appl. No.: 11/988,356

(22) PCT Filed: Jun. 14, 2006

(86) PCT No.: PCT/EP2006/005689
§ 371 (c)(1),
(2), (4) Date: Mar. 12, 2008

(87) PCT Pub. No.: WO2007/003258
PCT Pub. Date: Jan. 11, 2007

(65) Prior Publication Data
US 2009/0000416 A1    Jan. 1, 2009

(30) Foreign Application Priority Data

Jul. 6, 2005   (DE) .......................... 10 2005 031 594

(51) Int. Cl.
*B62D 1/18*    (2006.01)

(52) U.S. Cl. ......................................................... 74/493
(58) Field of Classification Search ................... 74/493, 74/497; 280/775, 779
See application file for complete search history.

(56) References Cited

U.S. PATENT DOCUMENTS

| 5,377,555 | A | * | 1/1995 | Hancock ......................... 74/493 |
| 5,524,927 | A | * | 6/1996 | Toussaint ...................... 280/777 |
| 7,415,908 | B2 | * | 8/2008 | Zernickel et al. ................ 74/493 |
| 2002/0083784 | A1 | * | 7/2002 | Brauer et al. ..................... 74/57 |

FOREIGN PATENT DOCUMENTS

DE   103 04 640 A1   8/2004
DE   103 16 190 A1   10/2004

* cited by examiner

*Primary Examiner* — Vicky Johnson
(74) *Attorney, Agent, or Firm* — Volpe and Koenig, P.C.

(57) ABSTRACT

A clamping device for the positional fixing of a vehicle steering column which can be adjusted in its length and/or inclination has a clamping disc and a plurality of rolling bodies, with clamping ramps for the rolling bodies being formed on the surface of the clamping disc, wherein the rolling bodies each make contact with one of a plurality of separate contact elements arranged in a common plane.

9 Claims, 3 Drawing Sheets

CLAMPING DEVICE FOR A STEERING COLUMN

This application is a 371 of PCT/EP2006/005689 filed Jun. 14, 2006.

FIELD OF THE INVENTION

The invention relates to a clamping device for the positional fixing of a vehicle steering column which can be adjusted in its length and/or inclination.

BACKGROUND OF THE INVENTION

A clamping device according to the precharacterizing clause of claim 1 is known, for example, from DE 103 04 640 A1. This clamping device comprises two disc-shaped clamping plate elements between which rolling bodies are guided, with the surface of one of the clamping plate elements having clamping ramps for the rolling bodies. This design of the clamping plate elements causes the axial distance between the clamping plate elements to change when one of the elements is pivoted relative to the other element. The rolling bodies are guided in a guide element which is arranged between the clamping plate elements. The entire clamping device can be installed as a preassembled unit in a motor vehicle.

OBJECT OF THE INVENTION

The invention is based on the object of providing a clamping device which is suitable for an adjustable steering column of a vehicle and is distinguished by a particularly compact and simple construction while being highly functional.

SUMMARY OF THE INVENTION

This object is achieved according to the invention by a clamping device with the features of claim 1. This clamping device which is provided for a steering column of a vehicle, in particular motor vehicle, comprises, in a manner known per se, a clamping disc and a plurality of rolling bodies rolling on the latter. However, in contrast to known clamping devices for steering columns, a second clamping disc is not provided. Instead, the rolling bodies on the side facing away from the single clamping disc make contact with individual contact elements arranged in a common plane. The contact elements which replace a clamping disc and the number of which corresponds to the number of rolling bodies have the advantage that they take up substantially less space than a complete clamping disc. In this manner, construction space is both saved and also provided for other functionalities and also a saving on weight is obtained.

According to a preferred refinement, the contact elements are guided in a common guide element which serves at the same time to guide the rolling bodies and is preferably manufactured from plastic. Whereas, in the case of the clamping devices according to the prior art, for example according to DE 103 04 640 A1, guide element and clamping discs can be arranged exclusively in an axially consecutive manner, in the clamping device according to the invention the guide element and the contact elements which replace one of the clamping discs at least partly occupy the same axial construction space.

In addition to receptacles for the contact elements and for the rolling bodies, in advantageous refinement the guide element can also have an adjustment contour which permits a linear adjustment, in particular height adjustment, of the steering column. This adjustment contour can be integrated into the guide element without additional axial or radial space being required. With the provision of the height adjustment function by means of the guide element, the necessity of realizing the corresponding function by means of the clamping disc ceases. The clamping disc can therefore be designed in a particularly simple manner without restrictions of the functionality.

As a further function of the guide element, a latching element can advantageously also be integrated therein. In this case, the guide element has a latching element for the latching in place of a lever serving to pivot the clamping disc. For this purpose, for example, a latching pin interacting with a latching contour of the guide element is integrally formed on the lever which is fastened to the clamping disc.

All of the contact elements which interact with the rolling bodies are located within an annular space which is arranged around the axis of the clamping device. It suffices in this connection if the contact elements extend as a whole in the circumferential direction over less than half of the imaginary annular space. In other words: a circular line which runs symmetrically about the axis of the clamping device and runs in the centre of the annular space in which the contact elements are arranged runs overall at most over the half of its length through a contact element. If the clamping device comprises n contact elements, then, with identically designed contact elements, each of the contact elements extends at maximum over an angle of 360°/2n. In an axial view of the clamping device, the contact elements can describe, for example, a respective section of a ring, corresponding to a section of the imaginary annular space. However, in a preferred, particularly simple embodiment, the contact elements have a cylindrical basic shape, with the axes of the individual cylinders being arranged parallel to the central axis of the clamping device. The circular line described above runs through the axes of the essentially cylindrical contact elements if the individual contact elements are at an identical distance from the axis of the clamping device. The rolling bodies make contact with the end sides of the individual contact elements.

The contact elements, like the rolling bodies and the clamping disc, are preferably manufactured from metal. Within the clamping device, an axial force is therefore transmitted exclusively via metal parts. The contact elements preferably have greater elastic flexibility than the rolling bodies, and therefore, when the clamping device is in the clamping position, the rolling bodies, without being significantly deformed themselves, can form a small hollow in the end-side surface of the contact elements in a defined manner, thus limiting the surface pressure. The mechanical properties of the parts transmitting force are dimensioned in such a manner that, when the clamping device is actuated, the level of spread, as measured in the axial direction, is influenced by the deformation of the contact elements at most to a small extent lying within customary tolerances.

An exemplary embodiment of the invention is explained in more detail below with reference to a drawing, in which:

DETAILED DESCRIPTION OF THE DRAWING

Figure 1:
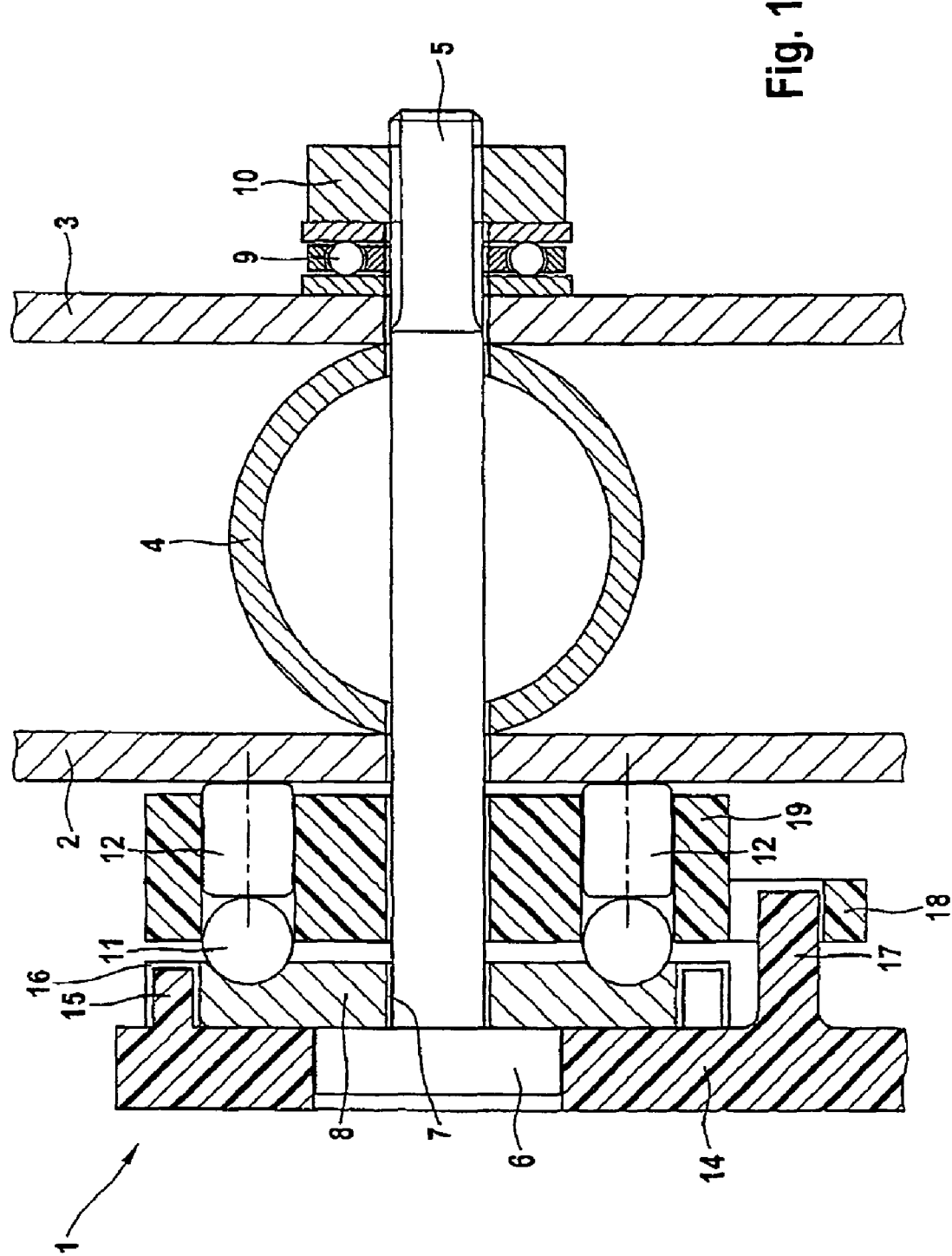
FIG. 1 shows, in a sectional illustration, a clamping device for a steering column.

A clamping device 1, which is illustrated schematically in FIG. 1, for a height-adjustable and axially adjustable steering column in a motor vehicle is fastened to two supporting arms 2, 3 installed fixedly in the motor vehicle. A retaining device 4 of a steering column (not illustrated specifically), which can be clamped firmly between the supporting arms 2, 3, is located between the supporting arms 2, 3. Both supporting arms 2, 3 are penetrated by a clamping bolt 5 which is part of the clamping device 1. A head 6 of the clamping bolt 5 bears against a clamping disc 8 which has a bore 7 and is spaced apart parallel from the supporting arms 2, 3. The clamping bolt 5, on its side which faces away from the head 6, is held on the supporting arm 3 by means of an axial bearing 9 and a closure piece 10.

Figure 2:
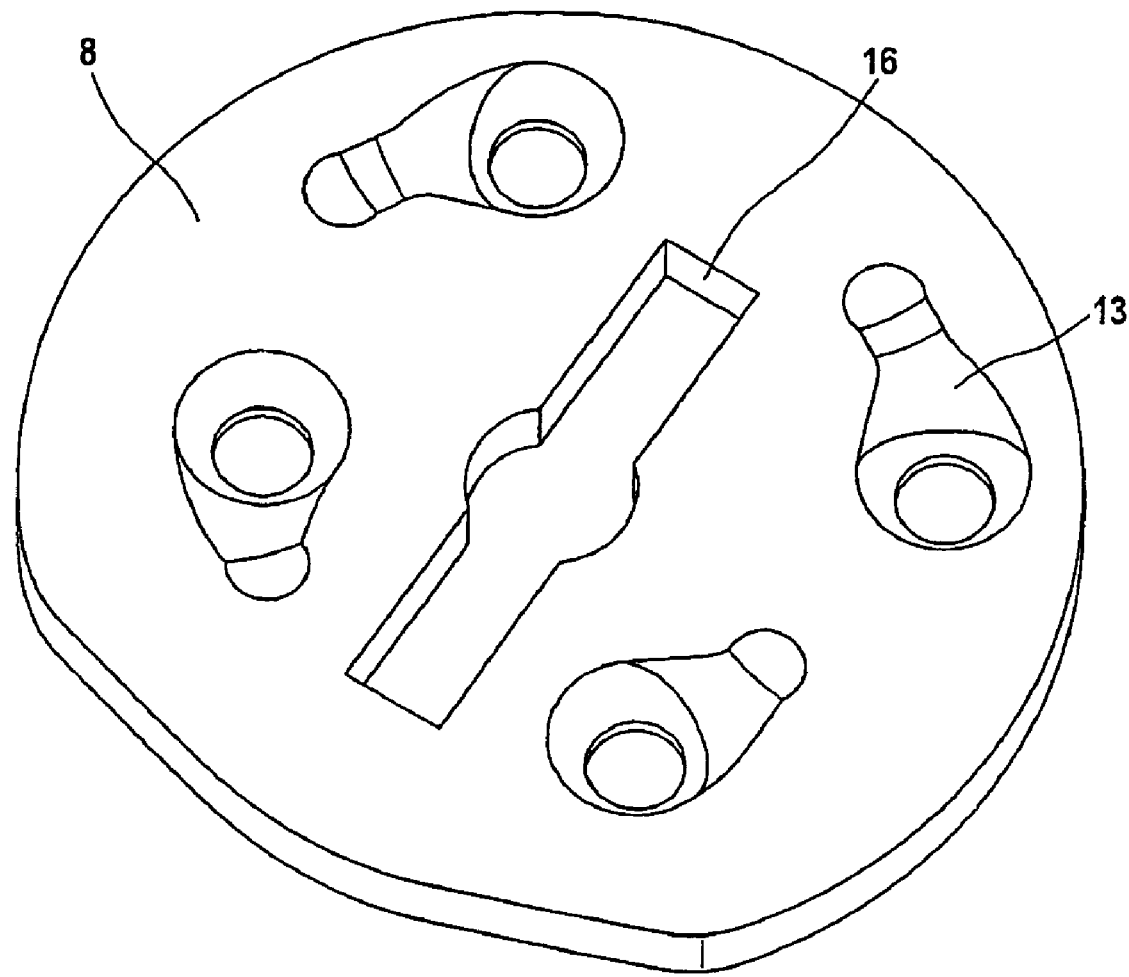
FIG. 2 shows, in a perspective illustration, a clamping disc of the clamping device according to FIG. 1.

The clamping between the supporting arms 2, 3 is obtained by the distance between the clamping disc 8 and the supporting arm 2 being varied by rotation of said clamping disc. In the process, the flow of force takes place from the head 6 of the clamping bolt 5 via the clamping disc 8 to rolling bodies 11 rolling thereon and continues to cylindrical contact elements 12 which make contact on one end side with the rolling bodies 11 and on the other end side with the supporting arm 2. The correct spreading of the clamping device 1 is achieved by means of clamping ramps 13 which are formed in the surface of the clamping disc 8, can be seen in FIG. 2 and on which the rolling bodies 11, which are spherical in the exemplary embodiment, roll.

In order to pivot the clamping disc 8, a manually actuable lever 14 made of plastic is fastened thereto. In this case, projections 15 which are integrally formed on the lever 14 engage in cutouts 16 of the clamping disc 8. The design of the clamping disc 8 according to FIG. 2 does not correspond to the schematic illustration according to FIG. 1 in respect of the possibility of fastening the lever 14, but is equivalent.

Figure 3:
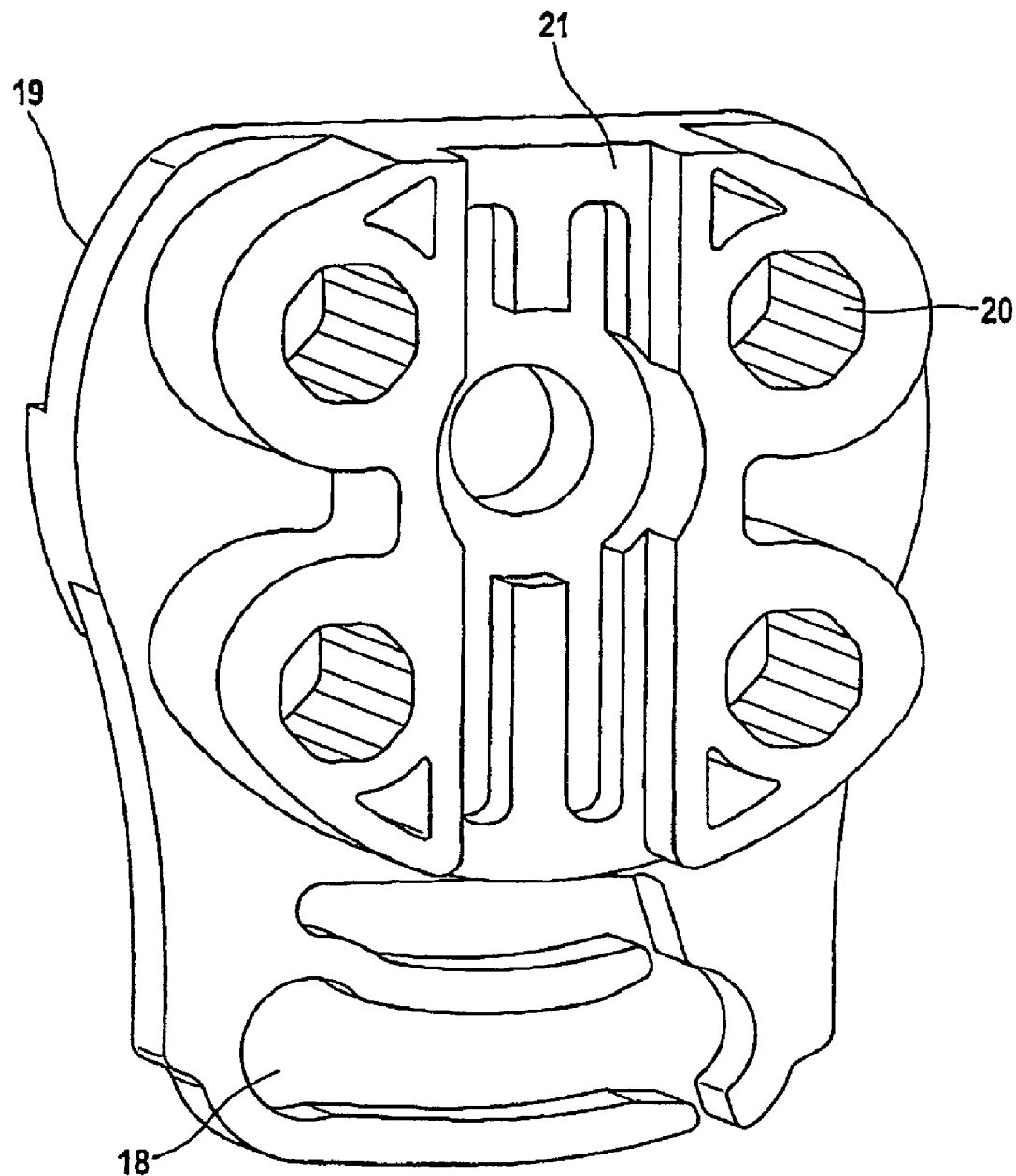
FIG. 3 shows, in a perspective illustration, a guide element for individual contact elements of the clamping device according to FIG. 1.

Furthermore, a pin 17 is integrally formed on the lever 14, only part of which is visible in FIG. 1, said pin interacting with a latching element 18, which can be seen in detail in FIG. 3, of a guide element 19 (explained in more detail below).

The primary function of the guide element 19 is the guidance of the four contact elements 12. For this purpose, the guide element 19 has four polygonal, approximately circular bores 20 in which a respective cylindrical contact element 12 is guided in an axially displaceable manner. At the same time, one of the rolling bodies 11 is also guided in each bore 20. As emerges from FIG. 3, the guide element 19 also has an adjustment contour 21 which permits a linear adjustment, in particular height adjustment, of the steering column in a simple manner. The guide element 19 is therefore a multi-function component which permits both a particularly compact construction and economical manufacturing of the clamping device 1.

The invention claimed is:

1. A clamping device for the positional fixing of a vehicle steering column which can be adjusted in its length and/or inclination, comprising a single clamping disc and a plurality of rolling bodies, with clamping ramps for the rolling bodies being formed on a surface of the clamping disc, wherein a side of each of the rolling bodies that faces in a direction opposite to the single clamping disc makes contact with a respective one of a plurality of separate, axially movable contact elements arranged in a common plane.

2. A clamping device of claim 1, wherein the contact elements are mounted in a common guide element.

3. A clamping device of claim 2, wherein the guide element is manufactured from plastic.

4. A clamping device of claim 2, wherein the guide element provided for the mounting of the contact elements serves at the same time to guide the rolling bodies.

5. A clamping device of claim 2, wherein the guide element has an adjustment contour for a linear adjustment.

6. A clamping device of claim 2, wherein the guide element has a latching element for the latching in place of a lever provided for pivoting the clamping disc.

7. A clamping device of claim 1, wherein the contact elements have a cylindrical basic shape.

8. A clamping device of claim 1, wherein the contact elements are manufactured of metal.

9. A clamping device of claim 1, wherein the contact elements have greater elastic flexibility than the rolling bodies.

* * * * *